United States Patent
Ionin et al.

(10) Patent No.: US 11,531,473 B1
(45) Date of Patent: Dec. 20, 2022

(54) SELECTIVE HMB BACKUP IN NVM FOR LOW POWER MODE

(71) Applicant: Western Digital Technologies, Inc., San Jose, CA (US)

(72) Inventors: Michael Ionin, Rehovot (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/471,608

(22) Filed: Sep. 10, 2021

(51) Int. Cl.
*G06F 3/06* (2006.01)
*G06F 11/10* (2006.01)

(52) U.S. Cl.
CPC ............ *G06F 3/0619* (2013.01); *G06F 3/064* (2013.01); *G06F 3/0625* (2013.01); *G06F 3/0679* (2013.01); *G06F 11/1068* (2013.01)

(58) Field of Classification Search
CPC ...... G06F 3/0619; G06F 3/0625; G06F 3/064; G06F 3/0679; G06F 11/1068
See application file for complete search history.

(56) References Cited

U.S. PATENT DOCUMENTS

| | | | |
|---|---|---|---|
| 9,659,664 B1* | 5/2017 | Griffin | G11C 16/3495 |
| 9,760,430 B2 | 9/2017 | Farhan et al. | |
| 10,055,236 B2 | 8/2018 | Erez et al. | |
| 10,585,792 B2 | 3/2020 | Shin et al. | |
| 10,872,012 B2 | 12/2020 | Subramanian et al. | |
| 10,956,323 B2 | 3/2021 | Juenemann et al. | |
| 11,403,011 B1* | 8/2022 | Gunda | G06F 3/0656 |
| 2013/0024735 A1* | 1/2013 | Chung | G06F 11/1048 714/704 |
| 2017/0003981 A1* | 1/2017 | Erez | G06F 3/0685 |
| 2017/0060668 A1* | 3/2017 | Farhan | G06F 12/0871 |
| 2017/0242606 A1* | 8/2017 | Vlaiko | G06F 13/4282 |
| 2018/0018101 A1 | 1/2018 | Benisty et al. | |
| 2019/0034306 A1* | 1/2019 | Wysocki | G06F 11/2094 |
| 2019/0042414 A1* | 2/2019 | Juenemann | G06F 12/0804 |
| 2019/0265888 A1 | 8/2019 | Yang | |
| 2020/0151055 A1 | 5/2020 | Eom et al. | |

(Continued)

FOREIGN PATENT DOCUMENTS

KR   20200085519 A   7/2020

OTHER PUBLICATIONS

International Search Report and Written Opinion for International Application No. PCT/US2022/028226 dated Sep. 15, 2022.

*Primary Examiner* — Francisco A Grullon
(74) *Attorney, Agent, or Firm* — Patterson & Sheridan, LLP; Steven H. VerSteeg (57) ABSTRACT

A data storage device includes a memory device and a controller coupled to the memory device. The controller is configured to store XOR parity data in a host memory buffer (HMB) of a host device, monitor a health of the memory device, determine that a threshold corresponding to the health of one or more blocks of the memory device has been reached or exceeded, and copy the XOR parity data from the HMB to the memory device. The controller is further configured to receive a low power mode indication from the host device and enter the low power mode after copying the XOR parity data from the HMB to the memory device. The controller is further configured to correct read failures using the XOR parity data retrieved from the HMB.

20 Claims, 5 Drawing Sheets

(56) References Cited

U.S. PATENT DOCUMENTS

| | | | |
|---|---|---|---|
| 2020/0218605 A1* | 7/2020 | Subramanian | G06F 11/108 |
| 2021/0096984 A1* | 4/2021 | Luo | G06F 12/0246 |
| 2021/0103517 A1* | 4/2021 | Kim | G06F 11/1068 |
| 2022/0050758 A1* | 2/2022 | Sheperek | G06F 11/1004 |
| 2022/0057935 A1* | 2/2022 | Sheperek | G11C 11/5642 |
| 2022/0237094 A1* | 7/2022 | Sheperek | G06F 3/0679 |

* cited by examiner

SELECTIVE HMB BACKUP IN NVM FOR LOW POWER MODE

BACKGROUND OF THE DISCLOSURE

Field of the Disclosure

Embodiments of the present disclosure generally relate to data storage devices, such as solid state drives (SSDs), and, more specifically, data recovery methods during low power modes.

Description of the Related Art

Non-volatile memory (NVM) express (NVMe) is based on a paired submission queue and completion queue mechanism. A host device places commands into the submission queue and a controller of a data storage device places completion messages associated with completed commands into the completion queue. In general, submission queues and completion queues are allocated in the memory of a host device, where each queue may be physically located contiguously or non-contiguously in the memory.

Because the amount of random access memory (RAM) in the data storage device is limited, the controller may be conservative about using RAM as a cache for user data (to limit the damage of a sudden power loss) and may store organizational metadata, such as a logical to physical (L2P) table, in the RAM. For fast and consistent performance, data structures are chosen to minimize the amount of computation and number of RAM lookups required at the expense of requiring more RAM. As a common cost reduction, the RAM may be allocated from a shared memory pool located in the host device, instead of adding additional RAM to the data storage device. A host memory buffer (HMB) may be allocated by the host device for use by the data storage device in PCIe/NVMe devices, which leverages the PCIe protocol to allow the controller direct access to the HMB.

The HMB is allocated as a fixed buffer during host device initialization and is fully given over to the data storage device as a dedicated memory location. The data storage device may then directly access the HMB and treat the HMB as an extension of the memory of the data storage device. When the data storage device enters a low power mode, the link between the host device and the controller is shut down. However, the controller may still continue to perform data management operations in the background (BKOPS) and may require data stored in the HMB. Because the link between the host device and the controller is shut down, the HMB is unavailable to the controller.

Therefore, there is a need in the art for an improved data recovery method when a data storage device is in a low power mode.

SUMMARY OF THE DISCLOSURE

The present disclosure generally relates to data storage devices, such as solid state drives (SSDs), and, more specifically, data recovery methods during low power modes. A data storage device includes a memory device and a controller coupled to the memory device. The controller is configured to store XOR parity data in a host memory buffer (HMB) of a host device, monitor the health of the memory device, determine that a threshold corresponding to the health of one or more blocks of the memory device has been reached or exceeded, and copy the XOR parity data from the HMB to the memory device. The controller is further configured to receive a low power mode indication from the host device and enter the low power mode after copying the XOR parity data from the HMB to the memory device. The controller is further configured to correct read failures using the XOR parity data retrieved from the HMB.

In one embodiment, a data storage device includes a memory device and a controller coupled to the memory device. The controller is configured to store XOR parity data in a host memory buffer (HMB) of a host device, monitor health of the memory device, determine that a threshold corresponding to the health of one or more blocks of the memory device has been reached or exceeded, and copy the XOR parity data from the HMB to the memory device.

In another embodiment, a data storage device includes a memory device and a controller coupled to the memory device. The controller is configured to store XOR parity data in a host memory buffer (HMB) of a host device, monitoring at least one of a bit error rate (BER) of one or more open blocks of the memory device, a number of program erase cycles (PECs) of the one or more open blocks of the memory device, a temperature variation of the one or more open blocks of the memory device, and an abnormality of one or more open blocks relative to a majority of open blocks of the memory device, determine that a threshold corresponding to the monitoring has been reached or exceeded, and copy the XOR parity data from the HMB to the memory device.

In another embodiment, a data storage device includes memory means and a controller coupled to the memory means. The controller is configured to determine that one or more blocks has exceeded a temperature threshold or has an abnormality with one or more blocks as compared to a majority of other blocks of the one or more blocks, retrieve XOR parity data from the memory means, perform a read operation to read first data from the one or more blocks or an adjacent block to the one or more blocks, perform error correction on first data with the XOR parity data retrieved from the memory means, determine that the one or more blocks that either exceeded the temperature threshold or had an abnormality no longer exceeds the temperature threshold or no longer has an abnormality, retrieve XOR parity data from a host memory buffer (HMB), perform a read operation to read second data from the one or more blocks or an adjacent block to the one or more blocks, and perform error correction on the second data with the XOR parity data retrieved from HMB.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, data recovery methods during low power modes. A data storage device includes a memory device and a controller coupled to the memory device. The controller is configured to store XOR parity data in a host memory buffer (HMB) of a host device, monitor a health of the memory device, determine that a threshold corresponding to the health of one or more blocks of the memory device has been reached or exceeded, and copy the XOR parity data from the HMB to the memory device. The controller is further configured to receive a low power mode indication from the host device and enter the low power mode after copying the XOR parity data from the HMB to the memory device. The controller is further configured to correct read failures using the XOR parity data retrieved from the HMB.

Figure 1:
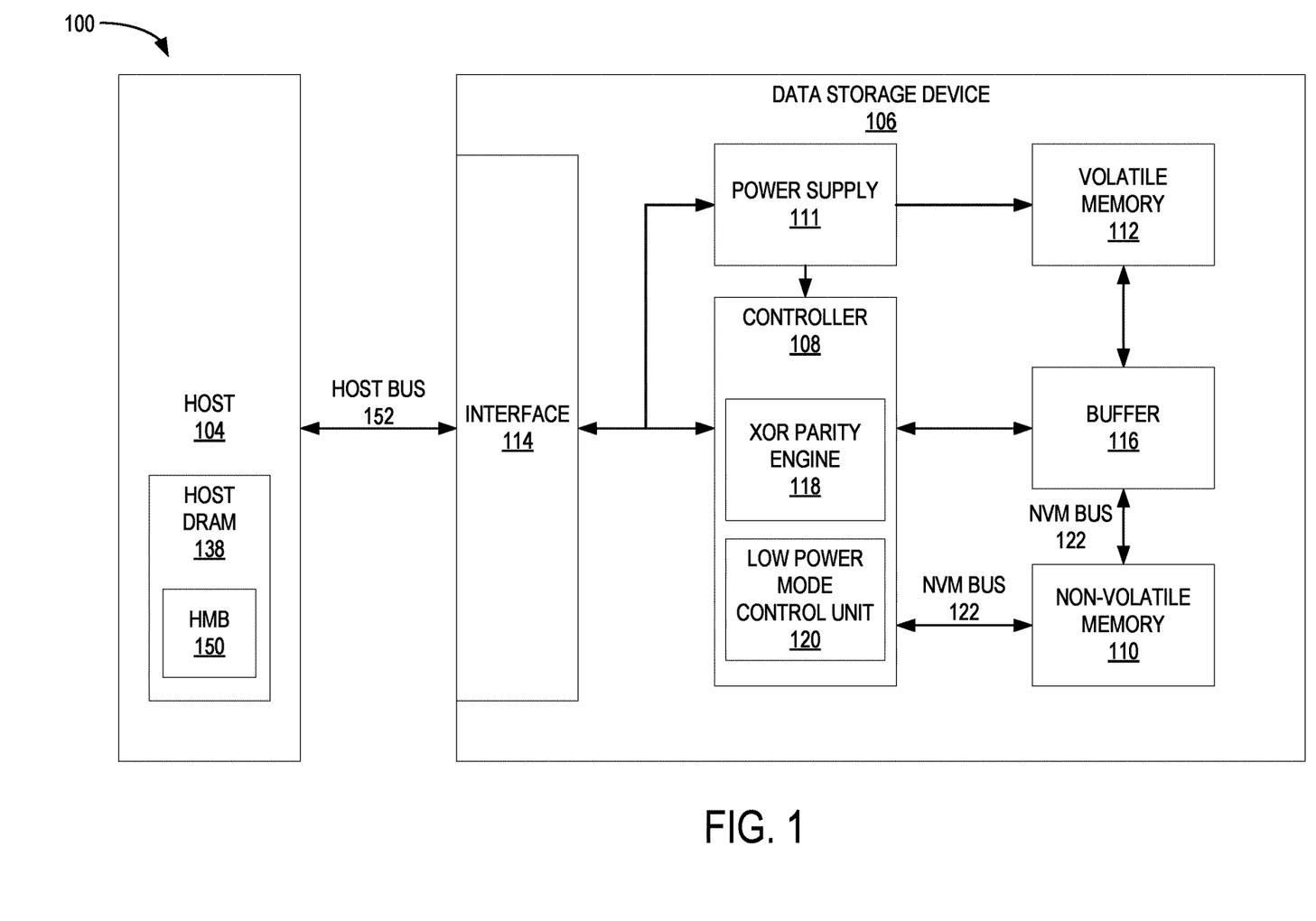
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host dynamic random access memory (DRAM) 138. The host DRAM 138 includes a host memory buffer (HMB) 150, which is a portion of the host DRAM 138 that is allocated to the data storage device 106 for use by a controller 108. For example, rather than storing data, such as metadata, XOR parity data, and the like in a volatile memory 112 or in an internal memory of the controller 108, such as DRAM, the controller 108 may instead store the data in the HMB 150. The host device 104 provides full access HMB 150 to the controller 108, such that the HMB 150 is an extension of the memory of the data storage device 106.

In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes the controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110.

In some embodiments, when the data storage device 106 receives a write command from the host device 104 via a host bus 152, the controller 108 temporarily stores the data associated with the write command in the internal memory or write buffer 116 before sending the data to the NVM 110 via an NVM bus 122 for transferring data. The host bus 152 may be referred to as a "link" herein for exemplary purposes. In other embodiments, when the data storage device 106 receives a write command from the host device 104, the controller 108 may send the data to the NVM 110 via the NVM bus 122 for transferring data without temporarily storing the data in the buffer 116.

The controller 108 includes an exclusive OR (XOR) parity engine 118 and a low power mode control unit 120. When data associated with a write command is received by the controller 108, the XOR parity engine 118 generates XOR parity data for the received data. The controller 108 then writes the XOR parity data to the HMB 150 as a backup to other data correction mechanisms, such as error correction code (ECC), low-density parity-check (LDPC), and the like. When data read from the NVM 110 has a read failure due to a bit error rate (BER) or a failed bit count (FBC) exceeding a threshold of the data correction mechanisms, the controller 108 may retrieve the XOR parity data from the HMB 150 to attempt to correct the data read from the NVM 110. In some examples, the XOR parity data of the last six written blocks are stored in the HMB 150. The previously listed number of written blocks is not intended to be limiting, and it is contemplated that the controller 108 may store XOR parity data associated with more or less than the listed number of blocks to the HMB 150.

The low power mode control unit 120 is configured to monitor a health of one or more blocks of the NVM 110 and copy XOR parity data from the HMB 150 to the NVM 110 in critical cases prior to the data storage device 106 transitioning to a low power state mode. In some examples, the low power mode control unit 120 may be configured to transfer XOR parity data from the HMB 150 to the NVM 110 prior to receiving a low power state mode transition request (i.e., during normal operation). The monitoring of the health of the one or more open blocks includes monitoring a BER of open blocks, which may include a time that the open blocks has been open, a program erase cycle (PEC) of the open blocks, extreme external conditions (e.g., temperature variations) of the open blocks or adjacent open blocks, and an abnormality of the one or more open blocks relative to a majority of open blocks or relative to adjacent open blocks of the NVM 110. It is to be understood that other factors related to the health of the one or more open blocks may be monitored and may be applicable to the embodiments described herein.

A critical case may be described as any monitored health factor of the one or more open blocks reaching or exceeding a threshold value associated with each of the health factors. The threshold value may be adjusted dynamically by the controller 108 during the operation of the data storage device 106 based on the health and characteristics of the NVM 110. Thus, once a critical case is determined, the controller 108 may retrieve the related XOR parity data from the HMB 150 and store the XOR parity data in the NVM 110. For example, if the low power mode control unit 120 determines that a block (either the block being read or an adjacent block) has an abnormal condition, such as an extreme temperature variation, the low power mode control unit 120 may alert to the controller 108 to retrieve the corresponding XOR parity data. Once the abnormal condition has subsided, the controller may update the XOR parity data stored in the HMB.

Figure 2:
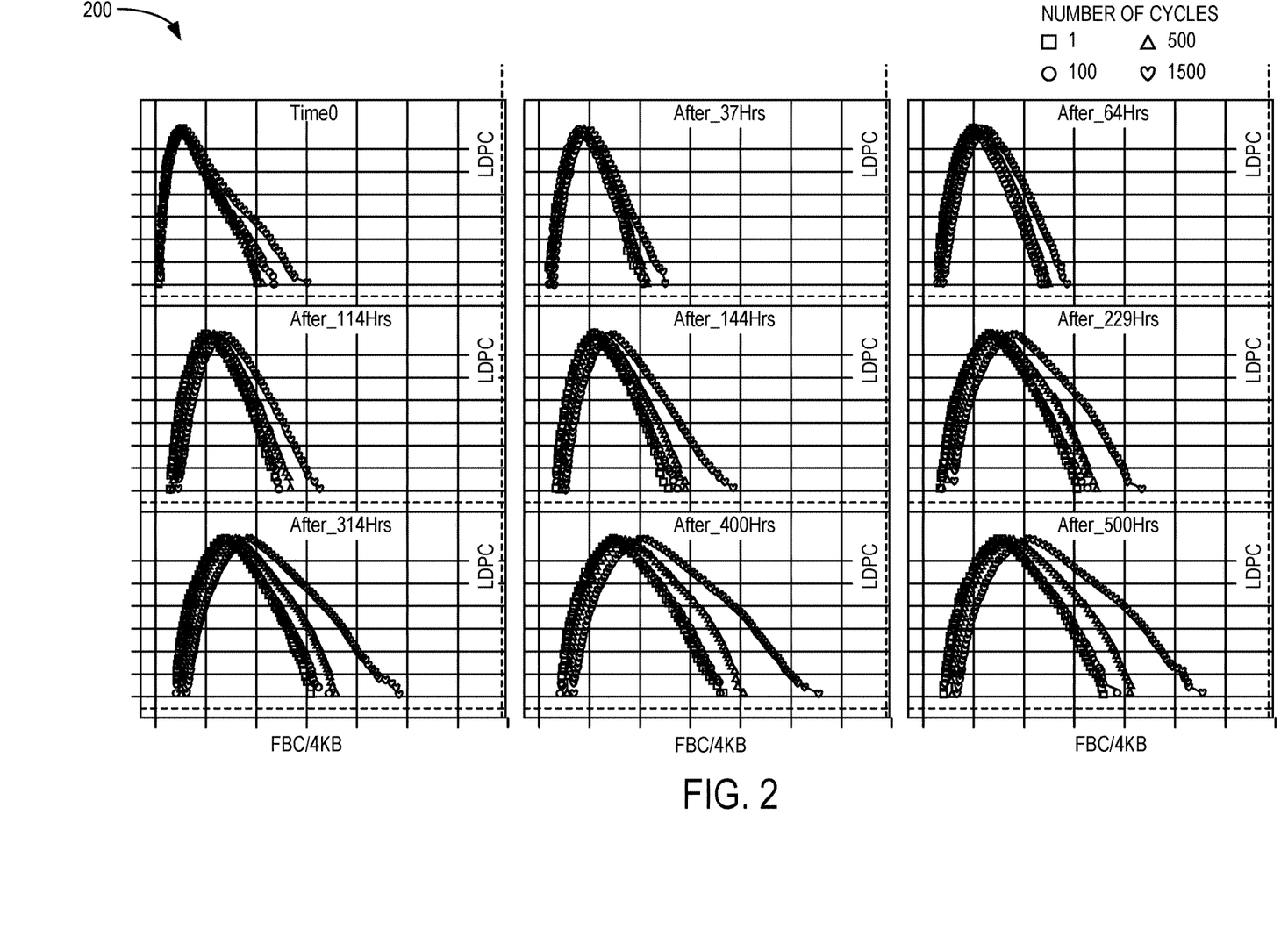
FIG. 2 is an illustration of a collection of graphs showing a failed bit count (FBC) distribution per cycling condition and open block retention, according to certain embodiments.

FIG. 2 is an illustration of a collection of graphs 200 showing a failed bit count (FBC) distribution per cycle (i.e., PEC) and open block retention, according to certain embodiments. It is to be understood that the collection of graphs 200 shown is intended to be an exemplary illustration and is non-limiting. Each title of a graph represents an open block retention time, such that "Time0" refers to an unused memory device or NVM, such as the NVM 110 of FIG. 1, and "After_400 Hrs" refers to, for example, 400 total hours of use that may be continuous or non-continuous. Furthermore, each curve represents a number of PECs. For example, a PEC of 1 refers to 1 program erase cycle and a PEC of 500 refers to 500 program erase cycles. The X axis, which is FBC/4 KB, represents a BER associated with the open blocks. The Y axis is the folder sector failure rate (Folded_SER) which is a probability of having a corresponding FBC.

As shown in the collection of graphs 200, as the number of PECs increases, the FBC/4 KB increases. Likewise, as the open block retention time increases, the FBC/4 KB value increases. The LDPC line shown at about 700 FBC/4 KB represents a LDPC decoding capability or a threshold FBC/4 KB value. The LDPC line may be adjusted dynamically based on operational conditions of the data storage device 106. Although, the FBC/4 KB for each of the cycles does not exceed or pass the LDPC line, the FBC/4 KB for each of the cycles grows close to exceeding or passing the LDPC line. Referring back to FIG. 1, the low power mode control unit 120 may determine the probability for a block to pass a BER threshold associated with a decoding capability. Thus, if the low power mode control unit 120 determines that the probability is not likely or that there is a high likelihood of a decoding/read failure occurring, the low power mode control unit 120 may cause the controller 108 to retrieve the XOR parity data associated with one or more blocks from the HMB 150 prior to entering a low power state mode.

Figure 3:
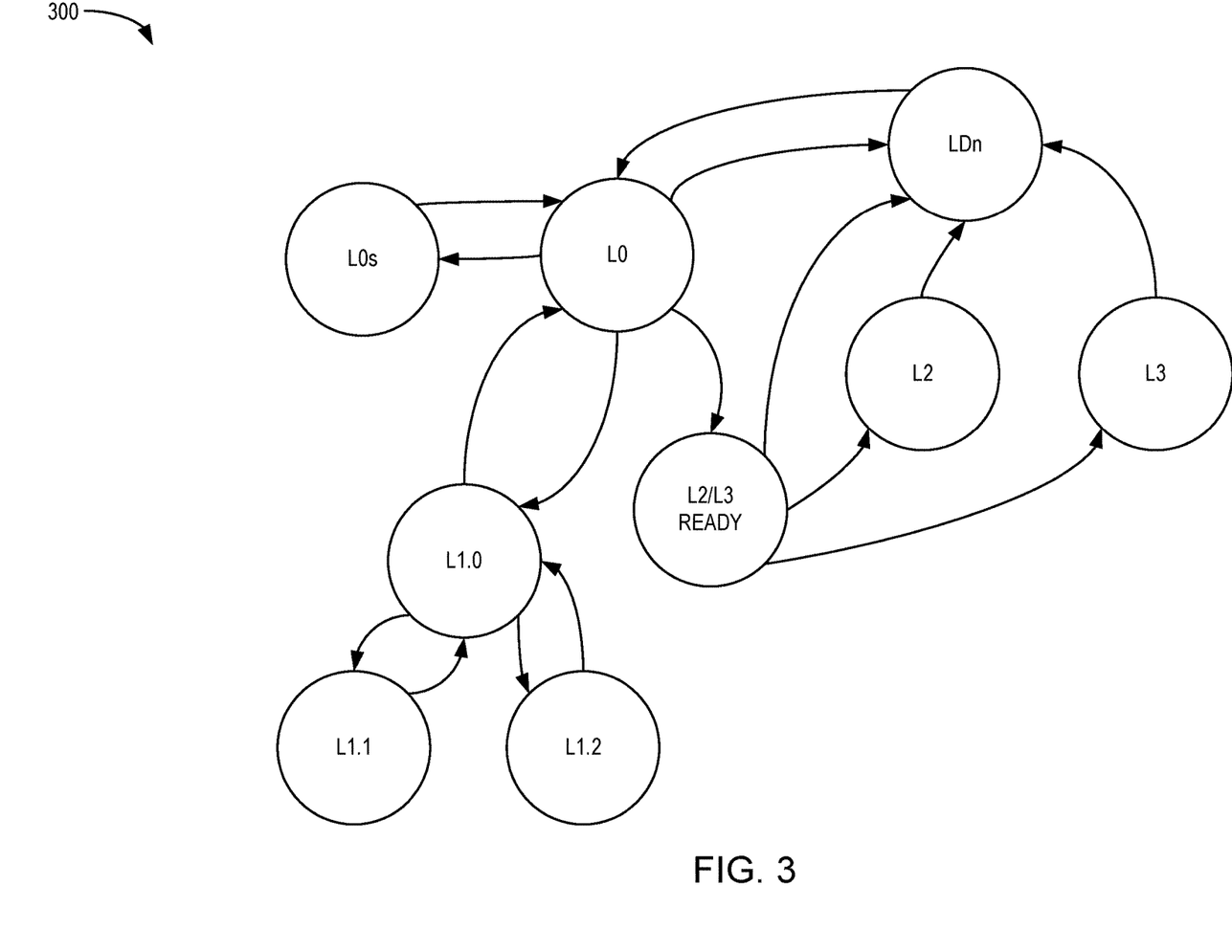
FIG. 3 is an illustration of a link power management flow diagram, according to certain embodiments.

FIG. 3 is an illustration of a link power management flow diagram 300, according to certain embodiments. Aspects of the storage system 100 may be referenced in the description herein for exemplary purposes. The data storage device 106 includes several power states. For example, the data storage device 106 may have the following 5 power states: L0, L0s, L1, L2, and L3, where L1 includes a L1.1 sub-state and a L1.2 sub-state. Each of the power states are associated with a distinct operation of the data storage device 106. Power states L0, L0s, and L1 are considered operational power states and utilize about 1 W to about 8 W of power, whereas power states L2 and L3 are considered non-operational power states, utilizing about 2 mW to about 50 mW of power.

An operational power state refers to the ability of the host device 104 to communicate with the NVM 110 of the data storage device 106. A non-operational power state refers to the inability of the host device 104 to communicate with the NVM 110 of the data storage device 106 due to a shut down or disconnection of a link between the host device 104 and the controller 108. The listed non-operational power states are not intended to be limiting and may include other power states, such as the L1.1 and L1.2 power states. Furthermore, it is contemplated that more or less power states than the number of power states shown in the link power management flow diagram 300 may be available and more or less low power states may be applicable to the embodiments described herein.

Power states are numbered sequentially, where higher numbers represent lower power requirements due to a greater number of offline circuits and corresponding higher exit latencies. Furthermore, each power state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the power states and exit latencies are not intended to be limiting, but to provide an example of possible embodiments.

L0 is referred to as a fully operational state, where I/O commands are enabled, and the device may generate interrupts. Interrupts are an automatic transfer of firmware execution due to a system timer or a user command. Power states L0s and L1 are also operational states; however, L0s and L1 may have a lower functionality than that of L0. For example, L0s has a similar power requirement as that of the L0, but only allows for a serial link in one direction. However, L1 allows for a bidirectional serial link and allows for a greater reduction in the power requirement, but has a higher exit latency than that of L0 and L0s. Power states L2 and L3 are non-operational power states have a power requirement less than that of the operational power states. Furthermore, memory devices 206 not used are placed in a non-operational power state, L2 and L3, to limit the idle power consumption to a minimal value.

In order for I/O commands to occur, the NVM 110 is woken up and placed into either L0, L0s, or L1. The controller 108 changes the power state of the NVM 110 from the operational power states, such as L0, L0s, or L1, to a different operational power state, such as L0, L0s, or L1, or to a non-operational power state, such as L2 or L3, depending on the situation. However, in order for the NVM 110 to be placed into L2 or L3, the NVM 110 will need to be in power state L2/L3 ready, which is a pseudo-state to prepare the component for a loss in power and reference clock(s). The controller 108 allocates the appropriate amount of power to return all power states L0s, L1, L2, L3 into power state L0 when a full operational state is required. For example, to return to L0 from L2 or L3, the NVM 110 transitions to a transient pseudo-state, LDn, before transitioning to L0. The LDn state may be a fundamental reset state, a hot reset state, or a link disable transmission state by the upstream component (e.g., the host device 104).

The power state L1, in some embodiments, includes additional sub-states, L1.1 and L1.2, where the power state L1 is referred to as L1.0. The L1 sub-states (L1SS), L1.1 and L1.2, may require more power for operation than L2 and L3; however, the L1SS utilizes less power than the L1.0 state. At an L1SS, the NVM 110 remains operational and requires less power to return to a more operational state, such as L1.0 or L0. Furthermore, the L1SS requires less time than the L2 and/or the L3 power states to return to a full active power state L0.

Figure 4:
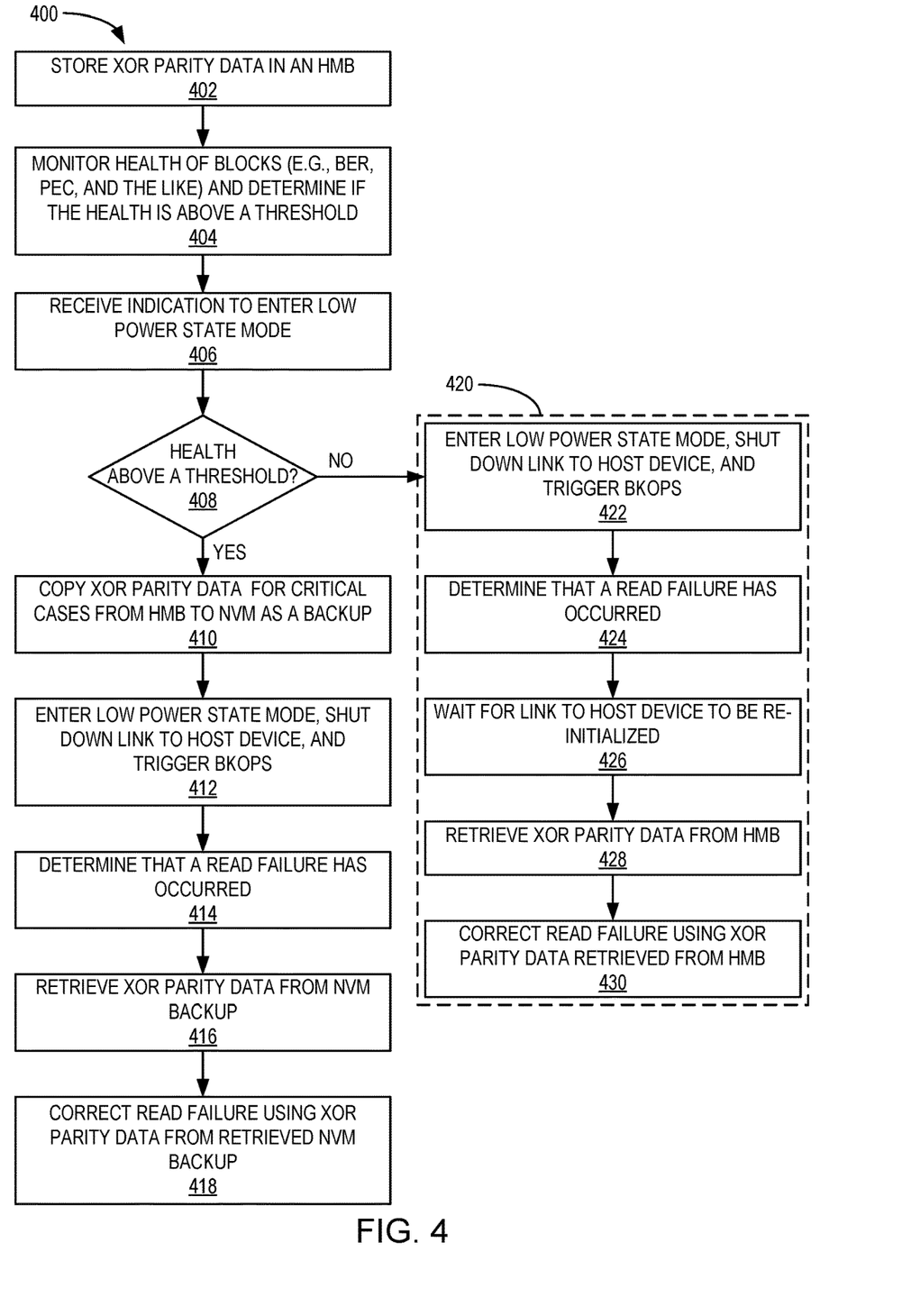
FIG. 4 is a flow diagram illustrating a method of correcting a read failure using XOR parity data, according to certain embodiments.

FIG. 4 is a flow diagram illustrating a method 400 of correcting a read failure using XOR parity data, according to certain embodiments. Aspects of the storage system 100 of FIG. 1 may be referenced in the description herein for exemplary purposes. For example, method 400 may be employed by the controller 108.

At block 402, the controller 108 stores XOR parity data generated by the XOR parity engine 118 in the HMB 150. The XOR parity data stored may be associated with a number of recently written blocks, such as the six most recently written to blocks, or up to as many data blocks in the NVM 110 that include valid data. At block 404, the low power mode control unit 120 monitors a health of one or more blocks and determines if the health is above a threshold. For example, the health may be associated with a BER, a PEC, a temperature variation, an abnormality of an open block when compared to other open blocks, and the like. At block 406, the controller 108 receives an indication to enter a low power state mode. The low power state mode may be any of the low power states, such as a L1SS, L2, or a L3 power state.

At block 408, the controller determines if the health of the one or more recently written to blocks is above a threshold value (e.g., a critical case). If the health is not above the threshold value at block 408, then method 400 continues to method 420, where method 420 may also describe a current method of correcting read failures using XOR parity data. At block 422, the data storage device 106 enters the low power state mode, where the link to the host device 104 is shut down and background operations (e.g., maintenance operations) are triggered. The background operations may include garbage collection, data relocation, wear leveling, and the like.

At block 424, the controller 108 determines that a read failure has occurred due to a BER or FBC exceeding a decoding capability of a decoder. Because the XOR parity data is stored in the HMB 150 and the link to the HMB is down, the controller 108 cannot access the HMB. Thus, the controller 108, at block 426, waits for the link to the host device 104 to be re-initialized.

After the link is re-initialized at block 426, the controller 108 retrieves the XOR parity data from the HMB 150 corresponding to the data associated with the read failure at block 428. At block 430, the controller 108 corrects the data associated with the read failure using the relevant XOR parity data retrieved from the HMB 150.

If the health is above a threshold at block 408, then the low power mode control unit 120 instructs the controller 108 to copy the XOR parity data from the HMB 150 to the NVM 110 to be used as backup for critical cases (e.g., the one or more blocks above the threshold value) at block 410. It is to be understood that the controller 108 may copy only the relevant XOR parity data (i.e., the XOR parity data associated with the one or more open blocks, which may include adjacent open blocks, above the threshold) or the XOR parity data associated with a number of recently written to open blocks. At block 412, the data storage device 106 enters the low power state mode, where the link to the host device 104 is shut down and background operations (e.g., mainte-nance operations) are triggered. The background operations may include garbage collection, data relocation, wear leveling, and the like.

At block 414, the controller 108 determines that a read failure has occurred, where the read failure may be associated with data read during the back ground operations at block 412. At block 416, the XOR parity data associated with the data corresponding to the read failure is retrieved from the NVM 110. At block 418, the controller 108 corrects the data associated with the read failure using the relevant XOR parity data retrieved from the NVM 110.

Figure 5:
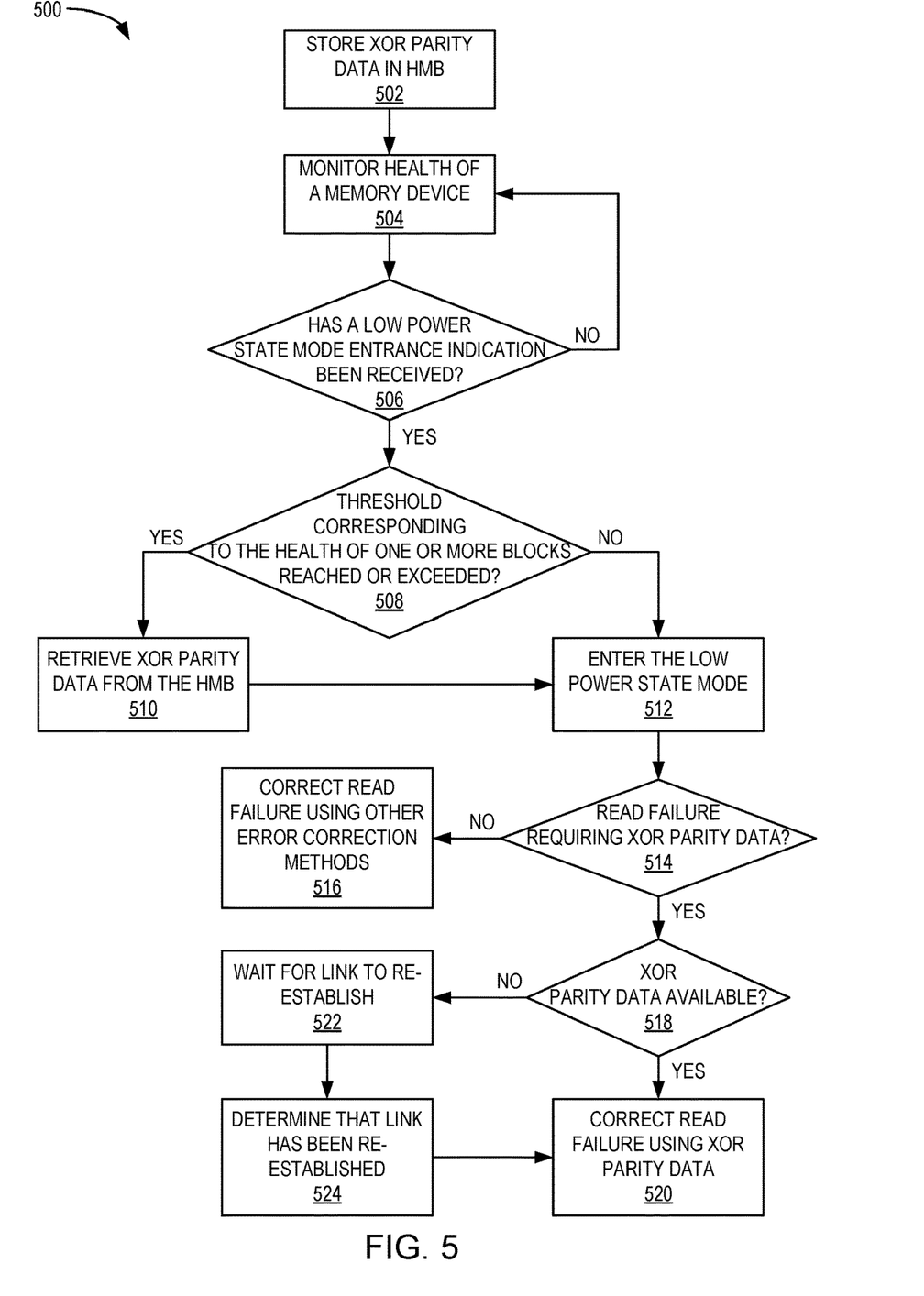
FIG. 5 is a flow diagram illustrating a method of correcting a read failure using XOR parity data, according to certain embodiments.

FIG. 5 is a flow diagram illustrating a method 500 of correcting a read failure using XOR parity data, according to certain embodiments. Aspects of the storage system 100 of FIG. 1 may be referenced in the description herein for exemplary purposes. For example, method 500 may be employed by the controller 108.

At block 502, the controller 108 stores XOR parity data generated by the XOR parity engine 118 in the HMB 150. The XOR parity data stored may be associated with a number of recently written blocks, such as the six most recently written to blocks, or up to as many data blocks in the NVM 110 that include valid data. At block 504, the low power mode control unit 120 monitors a health of one or more blocks and determines if the health is above a threshold. For example, the health may be associated with a BER, a PEC, a temperature variation, an abnormality of an open block when compared to other open blocks, and the like. At block 506, the controller 108 determines if a low power state mode entrance indication (e.g., a command) has been received. If there has not been a low power state mode entrance indication at block 506, then the low power mode control unit 120 continues to monitor the health of the one or more open blocks at block 504. However, if there has been a low power state mode entrance indication at block 506, then the controller determines if a threshold corresponding to the health of the one or more blocks has been reached or exceeded at block 508. For example, the threshold may be the LDPC line exemplified in the collection of graphs 200 of FIG. 2.

If the threshold corresponding to the health of the one or more blocks has been reached or exceeded at block 508, then the corresponding XOR parity data is retrieved from the HMB 150 and programmed to the NVM 110 by the controller 108 at block 510. However, if the threshold corresponding to the health of the one or more blocks has not been reached or exceeded at block 508 or after the relevant XOR parity data is retrieved from the HMB 150 and programmed to the NVM 110 at block 510, the data storage device 106 enters the low power state mode at block 512. When the data storage device 106 enters the low power state mode, the link between the HMB 150 and the controller 108 may be deactivated or shut down.

At block 514, the controller 108 determines if a read failure that has occurred during a background operation requires XOR parity data (i.e., cannot be corrected using other error correction methods). If the read failure can be corrected by other error correction methods other than using XOR parity data at block 514, the data associated with the read failure is corrected using other error correction methods at block 516. However, if the read failure requires XOR parity data at block 514, then the controller 108 determines if there is XOR parity data available at block 518. For example, if the relevant XOR parity data was copied from the HMB 150 to the NVM 110 at block 510, then the controller 108 may use the relevant XOR parity data to correct the data associated with the read failure. However, if there has not been any XOR parity data transferred to the NVM 110 prior to entering the low power state mode at block 512 or if the XOR parity data does not correspond with the data associated read failure, then the controller 108 is not able to correct the read failure.

If there is not XOR parity data available at block 518, then the controller 108 waits for the link to be re-established between the host device 104 and the controller 108 at block 522. At block 524, the controller 108 determines that the link has been re-established, such as when the data storage device 106 enters an operational power state. At block 520, the data associated with the read failure is corrected using the relevant XOR parity data. For example, if the relevant XOR parity data was transferred to the NVM 110 at block 510 prior to the data storage device 106 entering the low power state mode at block 512, then the controller 108 may retrieve the relevant XOR parity data from the NVM 110 to correct the data corresponding to the read failure. Otherwise, the relevant XOR parity data is retrieved from the HMB 150 by the controller 108, where the controller 108 uses the retrieved XOR parity data from the HMB 150 to correct the data corresponding to the read failure.

By copying XOR parity data from the HMB to the NVM when the data storage device receives a low power state mode entrance indication, the data storage device may have increased error correction capability during times that the link between the HMB and the controller is unavailable.

In one embodiment, a data storage device includes a memory device and a controller coupled to the memory device. The controller is configured to store XOR parity data in a host memory buffer (HMB) of a host device, monitor health of the memory device, determine that a threshold corresponding to the health of one or more blocks of the memory device has been reached or exceeded, and copy the XOR parity data from the HMB to the memory device.

The monitoring the health of the memory device comprises monitoring a bit error rate (BER) of one or more open blocks of the memory device. The monitoring the BER comprises monitoring an amount of time that a block is open. The monitoring the health of the memory device comprises monitoring a number of program erase cycles (PECs) of one or more open blocks of the memory device. The monitoring the health of the memory device comprises monitoring a temperature variation of one or more open blocks of the memory device. The monitoring the health of the memory device comprises monitoring an abnormality of one or more open blocks relative to a majority of open blocks of the memory device. The controller is further configured to receive an indication from the host device to enter a low power mode. Background operations are executed during the low power mode. The copying the XOR parity data from the HMB to the memory device occurs when the threshold corresponding to the health of one or more blocks of the memory device has been reached or exceeded and after receiving the indication from the host device to enter the low power mode. The controller is configured to utilize the XOR parity data copied to the memory device upon determining that a read failure has occurred.

In another embodiment, a data storage device includes a memory device and a controller coupled to the memory device. The controller is configured to store XOR parity data in a host memory buffer (HMB) of a host device, monitoring at least one (and in at one embodiment, at least two) of a bit error rate (BER) of one or more open blocks of the memory device, a number of program erase cycles (PECs) of the one or more open blocks of the memory device, a temperature variation of the one or more open blocks of the memory device, and an abnormality of one or more open blocks relative to a majority of open blocks of the memory device, determine that a threshold corresponding to the monitoring has been reached or exceeded, and copy the XOR parity data from the HMB to the memory device.

The controller is further configured to receive a command to enter a low power mode. The controller is further configured to, upon receiving the command to enter the low power mode, execute the copying. The controller is further configured to determine that a link between a host device and the memory device has been deactivated. The controller is configured to correct data of the one or more open blocks corresponding to the monitoring with the copied XOR parity data. The threshold is dynamic.

In another embodiment, a data storage device includes memory means and a controller coupled to the memory means. The controller is configured to determine that one or more blocks has exceeded a temperature threshold or has an abnormality with one or more blocks as compared to a majority of other blocks of the one or more blocks, retrieve XOR parity data from the memory means, perform a read operation to read first data from the one or more blocks or an adjacent block to the one or more blocks, perform error correction on first data with the XOR parity data retrieved from the memory means, determine that the one or more blocks that either exceeded the temperature threshold or had an abnormality no longer exceeds the temperature threshold or no longer has an abnormality, retrieve XOR parity data from a host memory buffer (HMB), perform a read operation to read second data from the one or more blocks or an adjacent block to the one or more blocks, and perform error correction on the second data with the XOR parity data retrieved from HMB.

The controller is further configured to update the XOR parity data stored in the HMB upon determining that the one or more blocks that either exceeded the temperature threshold or had an abnormality no longer exceeds the temperature threshold or no longer has an abnormality. The controller is further configured to determine that a link between a host device and the data storage device has been shut down. The controller is configured to, upon determining that the link has been shut down, trigger background operations.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, the controller configured to:
   store XOR parity data in a host memory buffer (HMB) of a host device;
   monitor health of the memory device;
   determine that a threshold corresponding to the health of one or more blocks of the memory device has been reached or exceeded; and
   copy the XOR parity data from the HMB to the memory device.

2. The data storage device of claim 1, wherein the monitoring the health of the memory device comprises monitoring a bit error rate (BER) of one or more open blocks of the memory device.

3. The data storage device of claim 2, wherein the monitoring the BER comprises monitoring an amount of time that a block is open.

4. The data storage device of claim 1, wherein the monitoring the health of the memory device comprises monitoring a number of program erase cycles (PECs) of one or more open blocks of the memory device.

5. The data storage device of claim 1, wherein the monitoring the health of the memory device comprises monitoring a temperature variation of one or more open blocks of the memory device.

6. The data storage device of claim 1, wherein the monitoring the health of the memory device comprises monitoring an abnormality of one or more open blocks relative to a majority of open blocks of the memory device.

7. The data storage device of claim 1, wherein the controller is further configured to receive an indication from the host device to enter a low power mode.

8. The data storage device of claim 7, wherein background operations are executed during the low power mode.

9. The data storage device of claim 7, wherein the copying the XOR parity data from the HMB to the memory device occurs when the threshold corresponding to the health of one or more blocks of the memory device has been reached or exceeded and after receiving the indication from the host device to enter the low power mode.

10. The data storage device of claim 1, wherein the controller is configured to utilize the XOR parity data copied to the memory device upon determining that a read failure has occurred.

11. A data storage device, comprising:
a memory device; and
a controller coupled to the memory device, the controller configured to:
store XOR parity data in a host memory buffer (HMB) of a host device;
monitoring at least one of a bit error rate (BER) of one or more open blocks of the memory device, a number of program erase cycles (PECs) of the one or more open blocks of the memory device, a temperature variation of the one or more open blocks of the memory device, and an abnormality of one or more open blocks relative to a majority of open blocks of the memory device;
determine that a threshold corresponding to the monitoring has been reached or exceeded; and
copy the XOR parity data from the HMB to the memory device.

12. The data storage device of claim 11, wherein the controller is further configured to receive a command to enter a low power mode.

13. The data storage device of claim 12, wherein the controller is further configured to, upon receiving the command to enter the low power mode, execute the copying.

14. The data storage device of claim 11, wherein the controller is further configured to determine that a link between a host device and the memory device has been deactivated.

15. The data storage device of claim 14, wherein the controller is configured to correct data of the one or more open blocks corresponding to the monitoring with the copied XOR parity data.

16. The data storage device of claim 11, wherein the threshold is dynamic.

17. A data storage device, comprising:
memory means; and
a controller coupled to the memory means, the controller configured to:
determine that one or more blocks has exceeded a temperature threshold or has an abnormality with one or more blocks as compared to a majority of other blocks of the one or more blocks;
retrieve XOR parity data from the memory means;
perform a read operation to read first data from the one or more blocks or an adjacent block to the one or more blocks;
perform error correction on first data with the XOR parity data retrieved from the memory means;
determine that the one or more blocks that either exceeded the temperature threshold or had an abnormality no longer exceeds the temperature threshold or no longer has an abnormality;
retrieve XOR parity data from a host memory buffer (HMB);
perform a read operation to read second data from the one or more blocks or an adjacent block to the one or more blocks; and
perform error correction on the second data with the XOR parity data retrieved from HMB.

18. The data storage device of claim 17, wherein the controller is further configured to update the XOR parity data stored in the HMB upon determining that the one or more blocks that either exceeded the temperature threshold or had an abnormality no longer exceeds the temperature threshold or no longer has an abnormality.

19. The data storage device of claim 17, wherein the controller is further configured to determine that a link between a host device and the data storage device has been shut down.

20. The data storage device of claim 19, wherein the controller is configured to, upon determining that the link has been shut down, trigger background operations.

* * * * *